(12) United States Patent
Kohsaka et al.

(10) Patent No.: US 10,711,323 B2
(45) Date of Patent: Jul. 14, 2020

(54) STEEL SHEET, AND PRODUCTION METHOD THEREFOR

(71) Applicant: JFE Steel Corporation, Tokyo (JP)

(72) Inventors: Noriaki Kohsaka, Tokyo (JP); Tatsuya Nakagaito, Tokyo (JP); Lingling Yang, Tokyo (JP)

(73) Assignee: JFE Steel Corporation, Tokyo (JP)

(*) Notice: Subject to any disclaimer, the term of this patent is extended or adjusted under 35 U.S.C. 154(b) by 0 days.

(21) Appl. No.: 16/323,959

(22) PCT Filed: Aug. 10, 2017

(86) PCT No.: PCT/JP2017/029037
§ 371 (c)(1),
(2) Date: Feb. 7, 2019

(87) PCT Pub. No.: WO2018/030503
PCT Pub. Date: Feb. 15, 2018

(65) Prior Publication Data
US 2019/0161823 A1 May 30, 2019

(30) Foreign Application Priority Data

Aug. 10, 2016 (JP) ................................ 2016-157762
Jun. 9, 2017 (JP) ................................ 2017-114147

(51) Int. Cl.
*C22C 38/54* (2006.01)
*C22C 38/50* (2006.01)
(Continued)

(52) U.S. Cl.
CPC ............... *C21D 9/46* (2013.01); *B32B 15/01* (2013.01); *B32B 15/011* (2013.01); *B32B 15/013* (2013.01); *B32B 15/04* (2013.01); *B32B 15/043* (2013.01); *B32B 15/18* (2013.01); *C21D 6/001* (2013.01); *C21D 6/002* (2013.01); *C21D 6/004* (2013.01); *C21D 6/005* (2013.01); *C21D 6/008* (2013.01); *C21D 6/02* (2013.01); *C21D 8/0205* (2013.01); *C21D 8/0226* (2013.01); *C21D 8/0236* (2013.01); *C21D 8/0263* (2013.01); *C22C 18/00* (2013.01); *C22C 18/04* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/18* (2013.01);
(Continued)

(58) Field of Classification Search
CPC ........ C21D 2211/008; C21D 2211/005; C21D 6/001; C21D 6/02; C21D 6/002; C21D 6/005; C21D 6/008; C21D 6/004; C21D 9/46; C21D 8/0263; C21D 8/0236; C21D 8/0226; C21D 8/0205; C23C 2/28; C23C 2/06; C23C 2/04; C23C 2/285; C23C 2/40; C23C 30/00; C23C 30/005; C22C 38/28; C22C 38/12; C22C 38/08; C22C 38/38; C22C 38/22; C22C 38/60; C22C 38/04; C22C 38/14; C22C 38/48; C22C 38/46; C22C 38/58; C22C 38/54; C22C 38/50; C22C 38/44; C22C 38/02; C22C 38/008; C22C 38/005; C22C 38/002; C22C 38/001; C22C 38/06; C22C 38/18; C22C 38/20; C22C 38/24; C22C 38/26; C22C 38/32; C22C 38/40; C22C 38/42; C22C 18/00; C22C 18/04; B32B 15/01; B32B 15/011; B32B 15/013; B32B 15/04; B32B 15/043; B32B 15/18; Y10T 428/12792; Y10T 428/12799; Y10T 428/12958; Y10T 428/12965; Y10T 428/12972
See application file for complete search history.

(56) References Cited

U.S. PATENT DOCUMENTS

2004/0202889 A1* 10/2004 Fujita .................... C23C 2/02
428/659
2012/0009434 A1 1/2012 Hata et al.
(Continued)

FOREIGN PATENT DOCUMENTS

EP 3219822 A1 9/2017
JP 2010285636 A 12/2010
(Continued)

OTHER PUBLICATIONS

Extended European Search Report for European Application No. 17 839 570.3, dated May 27, 2019, 7 pages.
(Continued)

*Primary Examiner* — Michael E. La Villa
(74) *Attorney, Agent, or Firm* — RatnerPrestia

(57) ABSTRACT

Provided are a steel sheet with excellent weldability, and a production method therefor.
The steel sheet is characterized by having a specific composition and a metallographic structure containing, in terms of an area ratio, ferrite of 25% or more and 65% or less, martensite having iron-based carbides precipitated in the grains of 35% or more and 75% or less, and the balance structure other than the ferrite and the martensite of 20% or less (including 0%) in total, the average grain diameters of the ferrite and the martensite being respectively 5 μm or lower, the total of concentration of Si and Mn at interface between the ferrite and the martensite being, in terms of an atomic concentration, 5% or more, and having a tensile strength of 900 MPa or higher.

20 Claims, No Drawings

(51) Int. Cl.
| | | |
|---|---|---|
| *C22C 38/48* | (2006.01) | |
| *C22C 38/46* | (2006.01) | |
| *C22C 38/44* | (2006.01) | |
| *C22C 38/06* | (2006.01) | |
| *C22C 38/58* | (2006.01) | |
| *C22C 38/02* | (2006.01) | |
| *C22C 38/00* | (2006.01) | |
| *B32B 15/01* | (2006.01) | |
| *C21D 6/00* | (2006.01) | |
| *C21D 9/46* | (2006.01) | |
| *C21D 8/02* | (2006.01) | |
| *C23C 2/06* | (2006.01) | |
| *C22C 38/14* | (2006.01) | |
| *C22C 38/04* | (2006.01) | |
| *C22C 38/60* | (2006.01) | |
| *C21D 6/02* | (2006.01) | |
| *C22C 38/22* | (2006.01) | |
| *C22C 18/00* | (2006.01) | |
| *C22C 38/38* | (2006.01) | |
| *C22C 38/08* | (2006.01) | |
| *C22C 38/12* | (2006.01) | |
| *C22C 38/28* | (2006.01) | |
| *C23C 2/28* | (2006.01) | |
| *C22C 18/04* | (2006.01) | |
| *C23C 2/40* | (2006.01) | |
| *C23C 30/00* | (2006.01) | |
| *C22C 38/26* | (2006.01) | |
| *C22C 38/32* | (2006.01) | |
| *C22C 38/20* | (2006.01) | |
| *C22C 38/40* | (2006.01) | |
| *C22C 38/42* | (2006.01) | |
| *C22C 38/18* | (2006.01) | |
| *C23C 2/04* | (2006.01) | |
| *C22C 38/24* | (2006.01) | |
| *B32B 15/04* | (2006.01) | |
| *B32B 15/18* | (2006.01) | |

(52) U.S. Cl.
CPC .............. *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C23C 2/04* (2013.01); *C23C 2/06* (2013.01); *C23C 2/28* (2013.01); *C23C 2/285* (2013.01); *C23C 2/40* (2013.01); *C23C 30/00* (2013.01); *C23C 30/005* (2013.01); *C21D 2211/005* (2013.01); *C21D 2211/008* (2013.01); *Y10T 428/12792* (2015.01); *Y10T 428/12799* (2015.01); *Y10T 428/12958* (2015.01); *Y10T 428/12965* (2015.01); *Y10T 428/12972* (2015.01)

(56) References Cited

U.S. PATENT DOCUMENTS

| | | |
|---|---|---|
| 2016/0168656 A1 | 6/2016 | Kawabe et al. |
| 2016/0319385 A1 | 11/2016 | Hasegawa et al. |
| 2017/0183751 A1 | 6/2017 | Tsunezawa et al. |
| 2017/0204492 A1 | 7/2017 | Ueda et al. |

FOREIGN PATENT DOCUMENTS

| | | |
|---|---|---|
| JP | 2011132602 | 7/2011 |
| JP | 2014034716 A | 2/2014 |
| JP | 2014080665 A | 5/2014 |
| JP | 2015200013 A | 11/2015 |
| JP | 5858199 B2 | 2/2016 |
| JP | 2016037650 A | 3/2016 |
| WO | 2012120020 A1 | 9/2012 |
| WO | 2016113789 A1 | 7/2016 |

OTHER PUBLICATIONS

International Search Report and Written Opinion for International Application No. PCT/JP2017/029037, dated Nov. 7, 2017—5 pages.
Yamashita et al., "Analysis Technology of Microstructure Formation in High Performance Dual Phase Steel", JFE Technical Report, No. 22 (Mar. 2017), pp. 25-29, originally published in JFE GIHO No. 37 (Feb. 2016, pp. 22-25).

\* cited by examiner

STEEL SHEET, AND PRODUCTION METHOD THEREFOR

CROSS REFERENCE TO RELATED APPLICATIONS

This is the U.S. National Phase application of PCT/JP2017/029037, filed Aug. 10, 2017, which claims priority to Japanese Patent Application No. 2016-157762, filed Aug. 10, 2016 and Japanese Patent Application No. 2017-114147, filed Jun. 9, 2017, the disclosures of each of these applications being incorporated herein by reference in their entireties for all purposes.

FIELD OF THE INVENTION

The present invention relates to a steel sheet and a production method therefor.

BACKGROUND OF THE INVENTION

In recent years, from the viewpoint of global environment conservation, the whole automobile industry aims to improve fuel efficiency of automobiles to regulate $CO_2$ emissions. To improve the fuel efficiency of automobiles, reducing the weight of automobiles by using the components thereof with thinner walls is most effective. Therefore, in recent years, the usage of high strength steel sheet (highly strengthened steel sheet) as a material for automobile parts has increased.

Meanwhile, weldability of steel sheets tends to deteriorate as the strength increases. Therefore, a steel sheet with not only high strength, but also excellent weldability is desired. A steel sheet that does not have satisfactory weldability cannot be used for the automobile parts or the like, because it causes problems such as cracking when joined by welding. To reduce the weight of the automobile parts or the like, it is essential to develop a steel sheet that has both high strength and weldability, and various techniques have been proposed so far to provide high strength cold-rolled steel sheets and hot-dip coated steel sheets that focus on weldability.

For example, according to PTL 1, a high strength hot-dip galvanized steel sheet with excellent spot weldability, anti-crash property and bending formability can be obtained by containing, in mass %, C: 0.05% or more and 0.15% or less, Si: 0.01% or more and 1.00% or less, Mn: 1.5% or more and 4.0% or less, P: 0.100% or less, S: 0.02% or less, Al: 0.01% or more and 0.50% or less, Cr: 0.010% or more and 2.000% or less, Nb: 0.005% or more and 0.100% or less, Ti: 0.005% or more and 0.100% or less, B: 0.0005% or more and 0.0050% or less, while containing Si, Mn, Cr and B in a specific content range, and having a metallographic structure (steel structure) including, in terms of an area ratio, ferrite: 10% or less, bainitic ferrite: 2% or more and 30% or less, and martensite: 60% or more and 98% or less, where the proportion of retained austenite determined by using an X-ray diffraction method is less than 2%, the proportion of massive martensite adjacent only to bainite in the whole metallographic structure is 10% or less, and a difference in hardness is specified between positions that are located 100 µm and 20 µm away from the surface.

According to PTL 2, a cold-rolled steel sheet with excellent spot weldability and with a tensile strength of 980 MPa or more can be obtained by containing, in mass %, C: 0.05% or more and 0.13% or less, Si: 0.05% or more and 2.0% or less, Mn: 1.5% or more and 4.0% or less, P: 0.05% or less, S: 0.005% or less, Al: 0.01% or more and 0.1% or less, Cr: 0.05% or more and 1.0% or less, Nb: 0.010% or more and 0.070% or less, Ti: 0.005% or more and 0.040% or less, and N: 0.0005% or more and 0.0065% or less, wherein 70% or more of Ti in the steel is precipitated, and 15% or more Nb in the steel is left in a solute state.

According to PTL 3, a cold-rolled steel sheet, a hot-dip galvanized steel sheet, and an hot-dip galvannealed steel sheet with excellent ductility, stretch flange formability and weldability, having a tensile strength of 980 MPa or more, and 0.2% proof stress of 700 MPa or less can be obtained, while these contain, in mass %, C: 0.07% or more and 0.15% or less, Si: 1.1% or more and 1.6% or less, Mn: 2.0% or more and 2.8% or less, P: more than 0% and 0.015% or less, S: more than 0% and 0.005% or less, Al: 0.015% or more and 0.06% or less, Ti: 0.010% or more and 0.03% or less, and B: 0.0010% or more and 0.004% or less, and have a metallographic structure to be described below having, at a position located ¼ of the sheet thickness away from the surface of the steel sheet, an area ratio satisfying tempered martensite: 10 area % or more and less than 30 area %, bainite: more than 70 area %, a total of tempered martensite and bainite: 90 area % or more, ferrite: 0 area % or more and 5 area % or less, and retained austenite: 0 area % or more and 4 area % or less.

PATENT LITERATURE

PTL 1: Japanese Patent No. 5858199
PTL 2: JP-A-2015-200013
PTL 3: JP-A2016-37650

SUMMARY OF THE INVENTION

In the technique proposed in PTL 1, only the C, Si, P and S contents are specified as the requirements for excellent spot weldability, and the spot weldability is not sufficient in some cases.

In the technique proposed in PTL 2, it is described that Nb-based precipitates are dissolved by heating at a temperature of (Ts-50)° C. or higher in the slab reheating process before hot rolling, but an annealing temperature of 900° C. or lower is a temperature range where Nb-based carbides are inevitably precipitated, thus it is difficult to stably leave 15% of Nb in a solute state.

In the technique proposed in PTL 3, while only lowering C is described as a direction for improving weldability, likewise in PTL 1, the spot weldability is not sufficient in some cases.

Aspects of the present invention were made under these circumstances, and it is an object according to aspects of the present invention to provide a steel sheet with a tensile strength of 900 MPa or more, an excellent weldability, and an excellent elongation, and a production method therefor.

To solve the problems mentioned above, the present inventors conducted intensive studies on the requirements for a steel sheet with both a tensile strength of 900 MPa or more and excellent weldability. The sheet thickness of the steel sheet addressed in this case was 0.4 mm or more and 3.2 mm or less. In spot welding, depending on conditions, a cracking problem occurred after welding. As a result of intensive studies on the welding conditions and the steel structures of the steel sheets where cracking occurred, it was found that, cracks are induced by grain boundary corrosion caused by zinc when welding a galvanized steel sheet and a cold-rolled steel sheet together or welding plated steel sheets to each other; and to improve the weldability of ferrites with excellent processability and martensite, it is effective to reduce the difference in hardness between soft ferrite and hard martensite that becomes source of stress concentration during spot welding, and to increase the surface energy of ferrite and martensite for reducing cracking after preventing the grain boundary corrosion by zinc. Aspects of the present invention were completed based on these findings and the summary of aspects of the invention is as follows.

[1] A steel sheet having a composition including, in mass %, C: 0.05% or more and 0.20% or less, Si: 0.60% or more and 1.65% or less, Mn: 1.8% or more and 3.5% or less, P: 0.05% or less, S: 0.005% or less, Al: 0.08% or less, and N: 0.0060% or less, the balance being Fe and inevitable impurities, the steel sheet having a metallographic structure containing, in terms of an area ratio, ferrite of 25% or more and 65% or less, martensite having iron-based carbides precipitated in the grains thereof of 35% or more and 75% or less, and the balance structure other than the ferrite and the martensite of 20% or less (including 0%) in total, average grain diameters of the ferrite and the martensite being respectively 5 μm or lower, and a total of concentrations of Si and Mn at interface between the ferrite and the martensite being, in terms of an atomic concentration, 5% or more, and the steel sheet having a tensile strength of 900 MPa or higher.

[2] The steel sheet described in item [1], in which the composition further includes, in mass %, at least one or two selected from the group consisting of V: 0.001% or more and 1% or less, Ti: 0.001% or more and 0.3% or less, and Nb: 0.001% or more and 0.3% or less.

[3] The steel sheet described in item [1] or [2], in which the composition further includes, in mass %, at least one or two selected from the group consisting of Cr: 0.001% or more and 1.0% or less, Mo: 0.001% or more and 1.0% or less, Ni: 0.001% or more and 1.0% or less, B: 0.0001% or more and 0.0050% or less, and Sb: 0.001% or more and 0.050% or less, and in which the total of concentrations of Cr, Mo, Ni, B and Sb at interface between the ferrite and the martensite being 5% or more in terms of an atomic concentration.

[4] The steel sheet described in any one of items [1] to [3], in which the composition further includes, in mass %, 0.0001% or more and 0.1% or less in total of at least one or two selected from the group consisting of REM, Sn, Mg, and Ca.

[5] The steel sheet described in any one of items [1] to [4], provided with a plated layer on a surface thereof.

[6] The steel sheet described in item [5], in which the plated layer has a composition including, in mass %, Fe: 20.0% or less, Al: 0.001% or more and 3.5% or less, and 0% or more and 3.5% or less in total of at least one or two selected from Pb, Sb, Si, Sn, Mg, Mn, Ni, Cr, Co, Ca, Cu, Li, Ti, Be, Bi and REM, the balance being Zn and inevitable impurities.

[7] The steel sheet described in item [5] or [6], in which the plated layer is an alloyed hot-dip layer.

[8] A production method for the steel sheet described in any one of items [1] to [4], including: heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower; cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, and cooling under conditions that an average cooling rate is 35° C./s or more between cooling start temperature and 450° C., and a retention time at 150° C. or higher and 250° C. or lower is 20 seconds or more.

[9] A production method for the steel sheet described in any one of items [5] to [7], including: heating a steel material at 1150° C. or higher and 1350° C. or lower, hot rolling including rough rolling and finish rolling the steel material at a finishing temperature of the finish rolling being 820° C. or higher, and coiling at 350° C. or higher and 680° C. or lower; cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing plating treatment by immersing the resultant cold-rolled steel material in a plating bath, or performing the plating treatment and then additionally performing alloying treatment, and after the plating treatment or the alloying treatment, cooling the resultant steel material under condition that the retention time at 150° C. or higher and 250° C. or lower is 20 seconds or more.

The steel sheet according to aspects of the present invention has both high strength of a tensile strength (TS): 900 MPa or more and excellent weldability, and also exhibits excellent elongation. When the steel sheet according to aspects of the present invention is applied to automobile parts, further reduction in weights of the automobile parts is realized.

DETAILED DESCRIPTION OF EMBODIMENTS OF THE INVENTION

Hereinafter, embodiments according to aspects of the present invention will be described. In addition, the present invention is not limited to the embodiments described below.
<Composition>
A steel sheet according to aspects of the present invention has a composition containing, in mass %, C: 0.05% or more and 0.20% or less, Si: 0.60% or more and 1.65% or less, Mn: 1.8% or more and 3.5% or less, P: 0.05% or less, S: 0.005% or less, Al: 0.08% or less, N: 0.0060% or less, and the balance being Fe and inevitable impurities.

The composition may further contain, in mass %, at least one or two selected from the group consisting of V: 0.001% or more and 1% or less, Ti: 0.001% or more and 0.3% or less, and Nb: 0.001% or more and 0.3% or less.

The composition may further contain, in mass %, at least one or two selected from the group consisting of Cr: 0.001% or more and 1.0% or less, Mo: 0.001% or more and 1.0% or less, Ni: 0.001% or more and 1.0% or less, B: 0.0001% or more and 0.0050% or less, and Sb: 0.001% or more and 0.050% or less.

Hereinafter, each of the components will be specifically described. In the following description, "%" representing the content of components refers to "mass %".

C: 0.05% or More and 0.20% or Less

Carbon (C) is an element related to the hardness of tempered martensite and effective for increasing the strength of the steel sheet. To obtain a tensile strength of 900 MPa or more, C content at least needs to be 0.05% or more. Meanwhile, when C content exceeds 0.20%, the hardness of the weld metal in spot welding excessively increases, and a difference in hardness with the heat affected zone (HAZ) occurs, thereby lowering spot weldability. Therefore, C content is in a range of 0.05% or more and 0.20% or less. Preferably, the lower limit of C content is 0.07% or more. More preferable is 0.08% or more, or still more preferable is 0.09% or more. Preferably, the upper limit of the C content is 0.17% or less. More preferable is 0.15% or less, or still more preferable is 0.13% or less.

Si: 0.60% or More and 1.65% or Less

Silicon (Si) is an element with an effect of lowering wettability of grain boundary by being segregated on the interface, and reducing occurrence of cracking by reducing grain boundary corrosion by zinc during spot welding. To obtain this effect, it is necessary for the Si content to be at least 0.60%. Meanwhile, when the Si content exceeds 1.65%, adverse effects on chemical conversion treatability and plating property become obvious, resulting in difficulty in application to automobile parts. Therefore, Si content is in a range of 0.60% or more and 1.65% or less. Preferably, the lower limit of the Si content is 0.70% or more. More preferable is 0.90% or more, or still more preferable is 1.10% or more. Preferably, the upper limit of the Si content is 1.60% or less. More preferable is 1.50% or less, or still more preferable is 1.40% or less.

Mn: 1.8% or More and 3.5% or Less

As with Si, manganese (Mn) is an element with an effect of reducing grain boundary corrosion in spot welding by being segregated on the interface. To obtain this effect, the Mn content is necessary to be 1.8% or more. Meanwhile, when the Mn content exceeds 3.5%, the chemical conversion treatability and the plating property deteriorate. Therefore, the Mn content is 1.8% or more and 3.5% or less. Preferably, the lower limit of the Mn content is 1.9% or more. More preferable is 2.1% or more, or still more preferable is 2.3% or more. Preferably, the upper limit of the Mn content is 3.2% or less. More preferable is 3.0% or less, or still more preferable is 2.8% or less.

P: 0.05% or Less

Phosphorus (P) is an element that induces low temperature embrittlement, and thus, P is an element that causes cracking during cooling at welding. Therefore, from the viewpoint of weldability, it is preferable to reduce the P content as much as possible, but in accordance with aspects of the present invention, P content is tolerated up to 0.05%. Preferable is 0.03% or less. While it is preferable to reduce the P content as much as possible and may be zero, 0.002% of P is inevitably mixed during production in some cases.

S: 0.005% or Less

Sulfur (S) forms coarse sulfides in steel, which are elongated during hot rolling to form wedge-shaped inclusions that adversely affect weldability. Therefore, it is preferable to reduce the S content as much as possible. In accordance with aspects of the present invention, S content can be tolerated up to 0.005%, and accordingly, the upper limit of S content is 0.005%. Preferable is 0.003% or less. While it is preferable to reduce the S content as much as possible and may be zero, 0.0002% of S is inevitably mixed during production in some cases.

Al: 0.08% or Less

Aluminum (Al) is added as a deoxidizer at the stage of steelmaking, and Al content is preferably 0.02% or more. More preferable is 0.03% or less. Meanwhile, Al forms coarse oxide which deteriorates weldability. Therefore, the upper limit of the Al content is 0.08%. Preferable is 0.07% or less. More preferable is 0.06% or less.

N: 0.0060% or Less

Nitrogen (N) is a harmful element that causes unexpected cracking by deteriorating natural aging property, or causes micro voids during spot welding to deteriorate weldability. Therefore, it is desirable to reduce the N content as much as possible, although the N content up to 0.0060% can be tolerated in accordance with aspects of the present invention. Preferable is 0.0050% or less. More preferable is 0.0040% or less. While it is preferable to reduce the N content as much as possible and may be zero, 0.0005% of N is inevitably mixed during production in some cases.

The above is the basic composition according to aspects of the present invention, but the following components (optional components) may be further contained.

At least one or two selected from the group consisting of V: 0.001% or more and 1% or less, Ti: 0.001% or more and 0.3% or less, and Nb: 0.001% or more and 0.3% or less Vanadium (V), titanium (Ti) and niobium (Nb) are elements that combine with C to form fine carbides, thereby contributing to produce the steel sheet with high strength. Meanwhile, when excessively contained, the elements are precipitated as coarse carbides, resulting in weldability deterioration. From the above viewpoint, V: 0.001% or more and 1% or less, Ti: 0.001% or more and 0.3% or less, and Nb: 0.001% or more and 0.3% or less is set. Preferably, the lower limit of the V content is 0.005% or more. More preferable is 0.010% or more, or still more preferable is 0.050% or more. Preferably, the upper limit of the V content is 0.6% or less. More preferable is 0.5% or less, or still more preferable is 0.4% or less. Preferably, the lower limit of the Ti content is 0.005% or more. More preferable is 0.010% or more, or still more preferable is 0.020% or more. Preferably, the upper limit of the Ti content is 0.2% or less. More preferable is 0.1% or less. Preferably, the lower limit of the Nb content is 0.005% or more. More preferable is 0.010% or more, or still more preferable is 0.030% or more. Preferably, the upper limit of the Nb content is 0.15% or less. More preferable is 0.10% or less, or still more preferable is 0.08% or less.

At least one or two selected from the group consisting of Cr: 0.001% or more and 1.0% or less, Mo: 0.001% or more and 1.0% or less, Ni: 0.001% or more and 1.0% or less, B: 0.0001% or more and 0.0050% or less, and Sb: 0.001% or more and 0.050% or less Chromium (Cr), molybdenum (Mo) and nickel (Ni) are elements which have an effect of contributing to produce the steel sheet with high strength and are segregated on interfaces to improve spot weldability. Meanwhile, when these elements are excessively contained, the transformation point greatly changes, and desired steel structure cannot be obtained and the chemical conversion treatability and the plating property are deteriorated. Boron (B) and antimony (Sb) are elements that are segregated on the interfaces, thereby increasing surface energy required for crack generation and effectively reducing crack generation in spot welding. When these elements are added excessively, the effect is saturated, leading to waste of added elements. From the above viewpoint, Cr: 0.001% or more and 1.0% or less, Mo: 0.001% or more and 1.0% or less, Ni: 0.001% or more and 1.0% or less, B: 0.0001% or more and 0.0050% or less, Sb: 0.001% or more and 0.050% or less is set. Preferably, the lower limit of the Cr content is 0.010% or more. More preferable is 0.050% or more, or still more preferable is 0.100% or more. Preferably, the upper limit of the Cr content is 0.8% or less. More preferable is 0.7% or less, or still more preferable is 0.6% or less. Preferably, the lower limit of the Mo content is 0.010% or more. More preferable is 0.050% or more, or still more preferable is 0.100% or more. Preferably, the upper limit of the Mo content is 0.6% or less. More preferable is 0.5% or less, or still more preferable is 0.4% or less. Preferably, the lower limit of the Ni content is 0.010% or more. More preferable is 0.020% or more, or still more preferable is 0.030% or more. Preferably, the upper limit of the Ni content is 0.5% or less. More preferable is 0.4% or less, or still more preferable is 0.3% or less. Preferably, the lower limit of the B content is 0.0003% or more. More preferable is 0.0006% or more, or still more preferable is 0.0010% or more. Preferably, the upper limit of the B content is 0.0030% or less. More preferable is 0.0020% or less, or still more preferable is 0.0015% or less. Preferably, the lower limit of the Sb content is 0.005% or more. More preferable is 0.008% or more, or still more preferable is 0.010% or more. Preferably, the upper limit of the Sb content is 0.040% or less. More preferable is 0.030% or less.

At least one or two selected from the group consisting of REM, Sn, Mg, and Ca in total is 0.0001% or more and 0.1% or less REM, tin (Sn), magnesium (Mg) and calcium (Ca) are elements that improve spot weldability by spheroidizing inclusions. Meanwhile, when these elements are added excessively, the effect is saturated, leading to waste of added elements. From the above viewpoint, at least one or two selected from the group consisting of REM, Sn, Mg, and Ca in total is 0.0001% or more and 0.1% or less. Preferably, the lower limit of at least one or two selected from the group consisting of REM, Sn, Mg, and Ca in total is 0.0005% or more. Preferably, the upper limit of at least one or two selected from the group consisting of REM, Sn, Mg, and Ca in total is 0.02% or less.

The balance other than the components mentioned above is Fe and inevitable impurities. In addition, when the above optional components are contained in an amount less than the lower limit, the optional elements are regarded to be contained as inevitable impurities, respectively.

<Steel Structure>

Next, the steel structure of a steel sheet according aspects of to the present invention will be described. The steel structure of a steel sheet according to aspects of the present invention includes, in terms of an area ratio, 25% or more and 65% or less of ferrite, 35% or more and 75% or less of martensite having iron-based carbides precipitated in the grains thereof, and 20% or less (including 0%) in total of components other than the ferrite and the martensite as the balance structure, the average grain diameters of the ferrite and the martensite being respectively 5 μm or lower, and the total of concentrations Si and Mn at interface between the ferrite and the martensite is 5 atomic % or higher in terms of an atomic concentration. In addition, "atomic %" is a unit of atomic concentration and is sometimes simply referred to as "%".

The area ratio of ferrite being 25% or more and 65% or less

Ductility is required for use as automobile parts, and the area ratio of ferrite is 25% or more to obtain desired elongation. Meanwhile, since ferrite is a soft structure, when it exceeds 65%, a tensile strength of 900 MPa or more cannot be obtained. Therefore, the area ratio of ferrite is 25% or more and 65% or less. Preferably, the lower limit of the area ratio is 35% or more. More preferable is 40% or more. Preferably, an upper limit of the area ratio is 60% or less. More preferable is 58% or less.

The area ratio of martensite having iron-based carbides precipitated in the grains thereof being 35% or more and 75% or less The martensite having iron-based carbides precipitated in the grains thereof is a structure that substantially increases the strength of the steel according to aspects of the present invention. To obtain a tensile strength of 900 MPa or more, the area ratio of martensite is necessary to be 35% or more. Meanwhile, when the area ratio of the martensite exceeds 75%, desired elongation cannot be obtained. Therefore, the area ratio of martensite having iron-based carbides precipitated in the grains thereof is 35% or more and 75% or less. Preferably, the lower limit of the area ratio is 37% or more. More preferable is 40% or more. Preferably, the upper limit of the area ratio is 70% or less. More preferable is 60% or less. Further, by iron-based carbide, it means cementite, η carbide, χ carbide, ε carbide, or the like.

The martensite described above is a structure obtained in the cooling process during annealing, and it is produced when Ms point is high, in the process of cooling from 250° C. to 150° C. Therefore, it is necessary to perform cooling under the condition that the retention time is 20 seconds or more, for cooling from 250° C. to 150° C. in the cooling process after annealing. In this case, the average grain diameter of the precipitated iron-based carbides is 0.2 μm or less. The reason for not selecting martensite without carbides precipitates is because there is a wide difference in hardness between ferrite and martensite without carbide precipitates, which may induce cracks due to stress concentration during welding with a high possibility.

Total area ratio of components other than ferrite and martensite being 20% or less (including 0%)

As a structure other than the ferrite and the martensite having iron-based carbides precipitated in the grains thereof, there are, for example, bainite, martensite without carbides precipitated in the grains thereof, retained austenite, and pearlite. Since these structures deteriorate strength and deteriorate weldability, it is desirable to reduce them as much as possible. In particular, when the interfaces between ferrite and martensite are moved at a low temperature at which bainitic transformation occurs, the amounts of Si and Mn segregations decrease, and therefore, it is preferable to reduce bainite as much as possible. In accordance with aspects of the present invention, the total area ratio of the structures other than the ferrite and the martensite having iron-based carbides precipitated in the grains thereof is permitted up to 20%. Preferably, it is less than 15%, or more preferably, 8% Or less. The other structures mentioned above may be 0%, or sometimes, 1% or more or 2% or more.

Average grain diameter of each of the ferrite and the martensite having iron-based carbides precipitated in the grains thereof being 5 μm or less During welding, cracking occurs at the interfaces between ferrite and martensite having the iron-based carbides precipitated therein, and there is a large difference in hardness therebetween. Therefore, in order to reduce cracking by increasing the surface energy at the time when cracking occurs, it is necessary to reduce the grain diameters of the ferrite and the martensite having iron-based carbides precipitated therein. Thus, it is necessary that the average grain diameters of the ferrite and martensite having the iron-based carbides precipitated therein are reduced to 5 μm or less, respectively. Preferably, they are 4 μm or less. In accordance with aspects of the present invention, the average grain diameters of 1 μm or more are generally obtained in many cases.

The total of concentrations of Si and Mn segregated at the interface between ferrite and martensite having iron-based carbides precipitated in the grains thereof being 5% or more in terms of an atomic concentration Cracking due to grain boundary corrosion by zinc during spot welding is improved by preventing the grain boundary erosion. For this purpose, it is effective to lower the wettability of grain boundary. To obtain this effect, it is necessary that the total of the concentration of Si and Mn at the interface between ferrite and martensite having iron-based carbides precipitated in the grains thereof is 5% or more in terms of an atomic concentration. Preferably, it is 7% or more. The upper limit is substantially 25%, but not particularly limited thereto. In addition, it is often 20% or less or 15% or less.

Total of concentrations of Cr, Mo, Ni, B, and Sb segregated at the interface between ferrite and martensite being 5% or more in terms of an atomic concentration When at least one or two selected from the group consisting of Cr, Mo, Ni, B, and Sb is contained as selected elements (optional elements), to further improve the spot weldability, it is necessary that the total of concentrations of Cr, Mo, Ni, B and Sb at the interface between ferrite and martensite having iron-based carbides precipitated in the grains thereof is 5% or more in terms of an atomic concentration. Cr and Ni are effective elements for lowering the wettability of the grain boundary and preventing grain boundary corrosion by zinc. Mo, B and Sb have the effect of increasing the surface energy at the time when cracking occurs and thus reducing cracking. Preferably, the total atomic concentration of Cr, Mo, Ni, B and Sb is 7% or more. The upper limit of the above described atomic concentration is substantially 35%, but not particularly limited thereto. It is often 25% or less or 20% or less.

<Plated Layer>

Next, the plated layer will be described. When a steel sheet according to aspects of the present invention is a steel sheet with a plated layer, the type of the plated layer is not particularly limited, and examples may include a hot-dip plated layer, an electroplated layer, and the like. The composition of the plated layer is also not particularly limited, and any general composition may be used. For example, the plated layer contains, in mass %, Fe: 20.0% or less, Al: 0.001% or more and 3.5% or less, and further contains at least 0% but not more than 3.5% of at least one or two selected from the group consisting of Pb, Sb, Si, Sn, Mg, Mn, Ni, Cr, Co, Ca, Cu, Li, Ti, Be, Bi, and REM in total, and the balance being Zn and inevitable impurities. The plated layer may be an alloyed plated layer. In the alloyed plated layer, the Fe content in the plated layer is generally 5.0% or more and 20% or less.

<Production Method of Steel Sheet>

Next, a production method of a steel sheet according to aspects of the present invention will be described. The production method slightly differs between the production method of the steel sheet without the plated layer and the production method of the steel sheet with the plated layer, in the production condition whether the steel sheet is immersed in the plating bath. Hereinafter, a production method of a steel sheet without a plated layer and a production method of a steel sheet with a plated layer will be described in order.

The production method of the steel sheet (or the steel sheet with a plated layer) according to aspects of the present invention includes heating a steel material with the composition described above to 1150° C. or higher and 1350° C. or lower, performing hot rolling including rough rolling and finish rolling, in which a finishing temperature of the finish rolling is 820° C. or higher, and coiling at 350° C. or higher and 680° C. or lower (hot rolling step). Next, cold rolling is performed (cold rolling. step). Next, after cold rolling, performed are heating and then retaining at 840° C. or higher for 20 seconds or more and 180 seconds or less, cooling, retaining at 770° C. or higher and 820° C. or lower for 10 seconds or more, and cooling under the condition in which the average cooling rate is 35° C./s or more between cooling start temperature and 450° C., and the retention time at 150° C. or higher and 250° C. or lower is 20 seconds or more.

The hot rolling step is a step of heating a steel material with the composition described above at 1150° C. or higher and 1350° C. or lower, rough rolling and finish rolling, in which a finishing temperature of the finish rolling is 820° C. or higher, and coiling at 350° C. or higher and 680° C. or lower.

The steelmaking method for producing the steel material described above is not particularly limited, and a known steelmaking method using such as a converter, electric furnace or the like may be adopted. In addition, secondary refining may be performed in a vacuum degassing furnace. After that, from the viewpoint of productivity and quality problems, it is preferable to produce a slab (steel material) by continuous casting method. Slabs may be produced by using a known casting method such as ingot-slabbing method, or thin slab continuous casting method.

Heating Temperature of Steel Material: 1150° C. or Higher and 1350° C. or Lower

In accordance with aspects of the present invention, it is necessary to heat the steel material prior to rough rolling to prepare the steel structure of the steel material having a substantially homogeneous austenite phase. In addition, to prevent the formation of coarse inclusions, it is important to control the heating temperature. When the heating temperature is lower than 1150° C., it is impossible to obtain the desired finishing temperature for finish rolling. Meanwhile, if the heating temperature exceeds 1350° C., the scale loss increases and damage to the furnace body of the heating furnace increases. Therefore, the heating temperature of the steel material is 1150° C. or higher and 1350° C. or lower. Preferably, the lower limit of the heating temperature is 1180° C. or higher. Preferably, an upper limit of the heating temperature is 1320° C. or lower. The rough rolling conditions for the rough rolling after heating are not particularly limited.

During slab heating; segregation generated during casting is retained, and upon rolling, the segregation forms a band-like inhomogeneous structure in the sheet thickness direction. Since this can bring adverse effect on weldability, it is more desirable to satisfy Equation 1 below to reduce the effect of segregation.

$$\ln t - \frac{31270}{T+273} + 11.29 \geq 0 \qquad \text{[Expression 1]}$$

Here, t is a heating time (unit: seconds), and T is a heating temperature (unit: ° C.). Expression 1 is an experimentally determined conditional expression for reducing the adverse effect of Mn segregation, which causes band-like inhomogeneous structure, in slab heating. When the left side of Expression 1 is 0 or more, Mn diffuses during slab heating such that the adverse effect on weldability due to formation of band-like inhomogeneous structure is reduced.

Finishing Temperature of Finish Rolling: 820° C. or Higher

When finishing temperature of finish rolling is lower than 820° C., transformation from austenite to ferrite starts during rolling, and the local strength of the steel sheet fluctuates, resulting in deteriorated accuracy of the sheet thickness during the cold rolling in the subsequent step. Therefore, the finishing temperature for finish rolling is 820° C. or higher. Preferably, it is 840° C. or higher. In addition, the upper limit of the finishing temperature for finish rolling is not particularly limited, but substantially 1020° C. due to restrictions associated with the production facilities.

Coiling Temperature: 350° C. or Higher and 680° C. or Lower

When the coiling temperature is lower than 350° C., the shape of the hot rolled sheet deteriorates, and accuracy of the sheet thickness after cold rolling deteriorates. When the coiling temperature exceeds 680° C., an oxide film which cannot be removed by pickling is formed on the hot rolled sheet surface, thus impairing the surface appearance after cold rolling. Therefore, the coiling temperature is in a range of 350° C. or higher and 680° C. or lower. Preferably, a lower limit of the coiling temperature is 380° C. or higher. Preferably, an upper limit of the coiling temperature is 650° C. or lower.

The cold rolling step as a subsequent step is a step of cold rolling the hot rolled sheet after the hot rolling step. To obtain a desired sheet thickness, it is necessary to cold-roll the hot rolled sheet after the hot rolling step. Cold rolling may follow after pickling.

The rolling ratio for the cold rolling is not particularly limited, but generally 20% or more and 80% or less.

The subsequent annealing step includes retaining the cold-rolled steel sheet at 840° C. or higher for 20 seconds or more and 180 seconds or less after the cold rolling step, then cooling the cold-rolled steel sheet, retaining the resultant steel sheet at 770° C. or higher and 820° C. or lower for 10 seconds or more, and cooling the steel sheet under the condition in which the average cooling rate from the cooling start temperature to 450° C. is 35° C./s or more, and the retention time at 150° C. or higher and 250° C. or lower is 20 seconds or more.

Retaining at 840° C. or Higher for 20 Seconds or More and 180 Seconds or Less

This and the next steps are necessary for controlling an element concentration (atomic concentration) at the interface between ferrite and martensite having iron-based carbides precipitated in the grains thereof. Since diffusion rate of an element is rapid at the interface and the element is distributed according to its solubilities in ferrite and austenite, respectively, when the production process involves two-phase region annealing, it is impossible to obtain desired distribution of the element concentration. Therefore, the element concentration is made uniform at the time when the transformation from ferrite to austenite is almost completed in the annealing step, and then, in the following step, the element concentration distribution is controlled by utilizing element distribution accompanying interface movement during transformation from austenite to ferrite. Thus, in order to almost complete transformation from ferrite to austenite, retaining at 840° C. or higher for 20 seconds or more is necessary. Meanwhile, when the retention time exceeds 180 seconds, the grain diameters of ferrite and martensite having iron-based carbides precipitated in the grains thereof become large so that weldability deteriorates. Preferably, the lower limit is 30 seconds or more at 840° C. or higher. Preferably, an upper limit is 160 seconds or less. More preferable is 100 seconds or less, or still more preferable is 50 seconds or less. The upper limit of the heating temperature is generally 900° C. or lower.

Retaining at 770° C. or Higher and 820° C. or Lower for 10 Seconds or More

In this step, transformation from austenite to ferrite is carried out and the desired element concentration distribution according to the interface movement is obtained, and then the desired area ratio of the steel structure is obtained. From the above viewpoint, retaining at 770° C. or higher and 820° C. or lower for 10 seconds or more is necessary. Retaining at 780° C. or higher and 810° C. or lower for 20 seconds or more is preferable. The upper limit of the retention time is not particularly limited, but is substantially 60 seconds or less due to restrictions associated with the production facilities. Preferably, it is 50 seconds or less. To perform retaining at a temperature of 770° C. or higher and 820° C. or lower for 10 seconds or more after the heating and retaining at 840° C. or higher, cooling is performed after the heating and retaining at 840° C. or higher, but the cooling condition is not particularly limited. The cooling may be cooling that does not require condition adjustment, such as natural cooling.

Average Cooling Rate of 35° C./s or More Between Cooling Start Temperature and 450° C.

When the interfaces between austenite and ferrite moves at low temperature, since it is difficult to diffuse the substitutional element, desired element concentration distribution cannot be obtained. Therefore, it is required that the cooling rate is rapid. The mobility of the interfaces between austenite and ferrite is high in a temperature range exceeding 450° C. Therefore, the average cooling rate between the cooling start temperature and 450° C. is 35° C./s or more.

Preferably, it is 35° C./s or more. The upper limit is generally 100° C./s or less. Preferably, the cooling start temperature is 770° C. or higher. The retaining temperature of "retaining at 770° C. or higher and 820° C. or lower for 10 seconds or more" before the start of this cooling may coincide with the cooling start temperature, or the cooling start temperature may be lower. When the cooling start temperature is lower, the cooling condition between the retaining temperature and the cooling start temperature is not particularly limited. The cooling stop temperature may be 450° C. or lower. The cooling stop temperature described above means the cooling stop temperature of the cooling at the average cooling rate and, so, cooling such as radiation cooling occurs naturally after the cooling described above. Thus, there are a retention time at a temperature range of 350° C. or higher and 450° C. or lower and a retention time at a temperature range of 150° C. or higher and 250° C. or lower.

After cooling to 450° C. or lower, it is preferable to control the holding time to reduce the bainite transformation. Specifically, the retention time at 350° C. or higher and 450° C. or lower, which is the temperature range that the bainite transformation proceeds, is 120 seconds or less. When the retention time at that temperature exceeds 120 seconds or more, the bainite transformation proceeds and a desired amount of segregation may not be obtained. While there is no desirable lower limit of time, retaining is substantially for 2 seconds or more when implemented in operation. The retention time is often 20 seconds or more.

Retaining at 150° C. or Higher and 250° C. or Lower for 20 Seconds or More

While preventing transformation of austenite under this condition, metallographic structure having transformed to martensite is, by self-tempering, changed to martensite having iron-based carbides precipitated therein. Meanwhile, when the temperature exceeds 250° C. or is lower than 150° C., iron-based carbide cannot be effectively precipitated. Also, when the retention time is less than 20 seconds at 150° C. or higher and 250° C. or lower, martensite having iron-based carbides precipitated therein cannot be obtained. Therefore, retaining at 150° C. or higher and 250° C. or lower for 20 seconds or more is set. Preferably, it is 150° C. or higher and 250° C. or lower for seconds or more. The upper limit is not particularly provided, but substantially 90 seconds in consideration of the facility restrictions. However, it is often 60 seconds or less.

Next, a production method of a steel sheet with a plated layer will be described. Since the process until the cold rolling is same as the production method of a steel sheet without the plated layer, redundant explanation thereof will be omitted. The production method of a steel sheet with a plated layer includes, after the cold rolling step, retaining at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., and performing plating treatment by immersing the steel sheet in a plating bath, or performing the plating treatment and then additionally performing alloying treatment, and after the plating treatment or the alloying treatment, cooling under a condition in which the retention time is 20 seconds or more at 150° C. or higher and 250° C. or lower. Conditions for the alloying treatment are not particularly limited, but a temperature for the alloying treatment is preferably 490° C. or higher and 580° C. or lower and the alloying treatment time is preferably 0.1 or more and 10 seconds or less.

Retaining at 840° C. or Higher for 20 Seconds or More and 180 Seconds or Less

This and the next steps are necessary for controlling the element concentration (atomic concentration) at the interface between ferrite and martensite having the cementites precipitated in the grains thereof. Since the diffusion rate of an element is rapid at the interface and the element is distributed according to its solubilities in ferrite and austenite, respectively, when the production process involves two-phase region annealing, it is impossible to obtain desired distribution of the element concentration. Therefore, the element concentration is made uniform at the time when the transformation from ferrite to austenite is almost completed in the annealing step, and then, in the following step, the element concentration distribution is controlled by utilizing the element distribution accompanying the interface movement during transformation from austenite to ferrite. Thus, in order to almost complete transformation from ferrite to austenite, retaining at 840° C. or higher for 20 seconds or more is necessary. Meanwhile, when the retention time exceeds 180 seconds, the grain diameters of ferrite and martensite having cementites precipitated in the grains thereof becomes large so that weldability deteriorates. Preferably, the lower limit of the retention time is 30 seconds or more at 840° C. or higher. Preferably, the upper limit is 160 seconds or less. More preferable is 100 seconds or less, or still more preferable is 50 seconds or less. An upper limit of the heating temperature is generally 900° C. or lower.

Retaining at 770° C. or Higher and 820° C. or Lower for 10 Seconds or More

In this step, transformation from austenite to ferrite is carried out and the desired element concentration distribution according to the interface movement is obtained, and then the desired area ratio of the steel structure is obtained. From the above viewpoint, retaining at 770° C. or higher and 820° C. or lower for 10 seconds or more is necessary. Retaining at 770° C. or higher and 820° C. or lower for 20 seconds or more is Preferable. The upper limit of the retention time is not particularly limited, but is substantially 60 seconds or less due to restrictions associated with the production facilities. Preferably, it is 50 seconds or less. To perform retaining at a temperature of 770° C. or higher and 820° C. or lower for 10 seconds or more after the heating and retaining at 840° C. or higher, cooling is performed after the heating and retaining at 840° C. or higher, but the cooling condition is not particularly limited. The cooling may be cooling that does not require condition adjustment, such as natural cooling.

Average Cooling Rate of 35° C./s or More between Cooling Start Temperature and 450° C.

When the interfaces between austenite and ferrite moves at low temperature, since it is difficult to diffuse the substitutional element, desired element concentration distribution cannot be obtained. Therefore, it is required that the cooling rate is rapid. The mobility of the interfaces between austenite and ferrite is high in a temperature range exceeding 450° C. Therefore, the average cooling rate between the cooling start temperature and 450° C. is 35° C./s or more. Preferably, it is 35° C./s or more. An upper limit of the average cooling rate is generally 100° C./s or less. Preferably, the cooling start temperature is 760° C. or higher. The retaining temperature of "retaining at 770° C. or higher and 820° C. or lower for 10 seconds or more" before the start of this cooling may coincide with the cooling start temperature, or the cooling start temperature may be lower. When the cooling start temperature is lower, the cooling condition between the retaining temperature and the cooling start temperature is not particularly limited. The cooling stop temperature may be 450° C. or lower.

After the cooling, plating is performed, and thereby, a steel sheet with a plated layer can be produced. The specific method of the plating treatment is not particularly limited, and may be either hot-dip plating or electroplating. In addition, in the case of hot-dip plating, alloying treatment may be additionally applied.

Retaining at 150° C. or Higher and 250° C. or Lower for 20 Seconds or More

While preventing transformation of austenite under this condition, the metallographic structure having transformed to martensite is changed, by self-tempering, to martensite having iron-based carbides precipitated therein. Meanwhile, when the temperature exceeds 250° C. or is lower than 150° C., iron-based carbide cannot be effectively precipitated. Also, when the retention time is less than 20 seconds at 150° C. or higher and 250° C. or lower, martensite having iron-based carbides precipitated therein cannot be obtained. Therefore, 150° C. or higher and 250° C. or lower for 20 seconds or more is set. Preferably, it is 150° C. or higher and 250° C. or lower for 30 seconds or more. The upper limit is not particularly provided, but substantially 90 seconds in consideration of the facility restrictions. However, it is often 60 seconds or less.

EXAMPLES

A steel material with a composition shown in Table 1 and with a thickness of 250 mm was subjected to hot rolling under hot rolling conditions shown in Table 2 to make a hot rolled sheet, subjected to cold rolling where the cold rolling reduction rate is 28% or more and 68% or less to make a cold rolled sheet, and then subjected to annealing under the conditions shown in Table 2 on a continuous annealing line or continuous hot-dip plating line. Next, the plating treatment and the alloying treatment, if necessary, were carried out. In this example, the temperature of the plating bath (plating bath composition: Zn-0.13 mass % Al) the steel sheet being immersed in the continuous hot-dip plating line was 460° C., and an amount of the coating weight of GI material (hot-dip plated steel sheet or hot-dip galvanized steel sheet) and of GA material (alloyed hot-dip plated steel sheet or hot-dip galvannealed steel sheet) were 45 to 65 g/m$^2$ per side, and an amount of Fe contained in the plated layer of the GA material was in a range of 6 to 14 mass %. In this example, when alloying was adopted, a temperature for the alloying treatment was 540° C. and the time for the alloying treatment was 4 seconds. In either case, the sheet thickness was in a range of 0.4 mm or more and 3.2 mm or less.

TABLE 1

| Steel No. | \multicolumn{16}{c}{Composition (mass %)} | Remarks |
|---|---|---|---|---|---|---|---|---|---|---|---|---|---|---|---|---|---|
| | C | Si | Mn | P | S | Al | N | V | Ti | Nb | Cr | Mo | Ni | B | Sb | Others | |
| A | 0.06 | 1.57 | 2.67 | 0.01 | 0.003 | 0.04 | 0.0026 | — | — | — | — | — | — | — | — | — | Ex. |
| B | 0.08 | 1.45 | 2.55 | 0.01 | 0.003 | 0.03 | 0.0026 | — | — | — | — | — | — | — | — | — | Ex. |
| C | 0.10 | 1.53 | 2.84 | 0.01 | 0.002 | 0.04 | 0.0027 | — | — | — | — | — | — | — | — | — | Ex. |
| D | 0.11 | 1.25 | 2.26 | 0.01 | 0.002 | 0.04 | 0.0025 | 0.34 | — | — | — | — | — | — | — | — | Ex. |
| E | 0.08 | 1.10 | 2.44 | 0.01 | 0.001 | 0.03 | 0.0030 | — | 0.08 | — | — | — | — | — | — | — | Ex. |
| F | 0.09 | 1.33 | 2.74 | 0.01 | 0.003 | 0.04 | 0.0033 | — | — | 0.07 | — | — | — | — | — | — | Ex. |
| G | 0.08 | 1.41 | 2.30 | 0.02 | 0.003 | 0.03 | 0.0020 | — | — | — | 0.65 | — | — | — | — | — | Ex. |
| H | 0.08 | 1.54 | 2.41 | 0.02 | 0.003 | 0.04 | 0.0020 | — | — | — | — | 0.29 | — | — | — | — | Ex. |
| I | 0.09 | 1.21 | 2.52 | 0.01 | 0.001 | 0.03 | 0.0032 | — | — | — | 0.13 | 0.18 | — | — | — | — | Ex. |
| J | 0.09 | 0.91 | 2.41 | 0.01 | 0.001 | 0.04 | 0.0025 | — | — | — | 0.33 | 0.13 | — | — | — | — | Ex. |
| K | 0.15 | 1.55 | 2.85 | 0.02 | 0.002 | 0.03 | 0.0035 | — | — | — | — | 0.24 | 0.04 | — | — | — | Ex. |
| L | 0.17 | 1.48 | 2.75 | 0.02 | 0.001 | 0.04 | 0.0030 | — | 0.02 | — | 0.08 | 0.2 | 0.03 | 0.0012 | — | — | Ex. |
| M | 0.08 | 1.43 | 2.40 | 0.02 | 0.002 | 0.04 | 0.0029 | — | 0.02 | — | 0.31 | — | — | — | 0.04 | REM: 0.001 Ca: 0.002 | Ex. |
| N | 0.09 | 0.95 | 2.35 | 0.01 | 0.003 | 0.03 | 0.0035 | 0.08 | 0.02 | 0.03 | 0.45 | 0.31 | 0.21 | 0.0015 | 0.02 | Sn: 0.02 Mg: 0.005 | Ex. |
| O | <u>0.04</u> | 1.52 | 2.35 | 0.02 | 0.001 | 0.03 | 0.0035 | — | — | — | — | — | — | — | — | — | Comp. Ex. |
| P | 0.10 | <u>0.23</u> | 2.65 | 0.02 | 0.003 | 0.04 | 0.0031 | — | — | — | 0.35 | — | — | — | — | — | Comp. Ex. |
| Q | 0.08 | 1.22 | <u>1.41</u> | 0.01 | 0.001 | 0.05 | 0.0033 | — | — | — | 0.35 | 0.31 | 0.28 | — | — | — | Comp. Ex. |

The values underlined are outside the ranges according to the present invention.

TABLE 2

| Steel Sheet No. | Steel | Surface | Hot rolling process | | | | | Annealing process | | | | | | | | Remarks |
|---|---|---|---|---|---|---|---|---|---|---|---|---|---|---|---|---|
| | | | Slab Heating Temp (°C.) | Expression (1) Left Side | Finish Rolling Finishing Temp (°C.) | Coiling Temp (°C.) | Cold Rolling Ratio (%) | Heating Temp (°C.) | Heating Retaining Time (s) | Post-Heating Retaining Temp (°C.) | Post-Heating Retaining Time (s) | Cooling Start Temp (°C.) | Cooling Rate (°C./s) *1 | Cooling Stop Temp (°C.) | 350-450° C. Retaining time (s) | 150-250° C. Retaining time During Cooling (s) | |
| 1 | A | CR | 1250 | 0.39 | 850 | 520 | 60 | 842 | 44 | 795 | 33 | 793 | 56 | 440 | 41 | 38 | Ex. |
| 2 | | GI | 1250 | 0.30 | 910 | 570 | 29 | 840 | 37 | 787 | 21 | 782 | 42 | 400 | 61 | 30 | Ex. |
| 3 | | GA | 1260 | 0.16 | 840 | 580 | 60 | 853 | 46 | 790 | 36 | 790 | 56 | 390 | 34 | 49 | Ex. |
| 4 | | CR | 1270 | 0.29 | 880 | 600 | 53 | 818 | 40 | 786 | 40 | 786 | 57 | 440 | 40 | 32 | Comp. Ex. |
| 5 | | CR | 1240 | 0.12 | 930 | 530 | 61 | 857 | 16 | 800 | 35 | 795 | 43 | 400 | 74 | 38 | Comp. Ex. |
| 6 | | CR | 1250 | 0.13 | 840 | 580 | 52 | 849 | 216 | 782 | 32 | 779 | 66 | 410 | 54 | 32 | Comp. Ex. |
| 7 | | CR | 1270 | 0.33 | 930 | 560 | 42 | 854 | 37 | 835 | 33 | 832 | 76 | 430 | 71 | 55 | Comp. Ex. |
| 8 | | GA | 1250 | 0.35 | 860 | 530 | 58 | 858 | 36 | 762 | 37 | 762 | 43 | 420 | 41 | 33 | Comp. Ex. |
| 9 | | CR | 1270 | 0.23 | 890 | 500 | 59 | 850 | 40 | 782 | 2 | 782 | 41 | 420 | 41 | 53 | Comp. Ex. |
| 10 | | CR | 1240 | 0.39 | 890 | 590 | 66 | 862 | 47 | 794 | 22 | 793 | 24 | 390 | 37 | 34 | Comp. Ex. |
| 11 | | CR | 1240 | 0.23 | 910 | 620 | 39 | 850 | 36 | 780 | 28 | 775 | 48 | 530 | 40 | 54 | Comp. Ex. |
| 12 | | CR | 1260 | 0.34 | 890 | 650 | 65 | 854 | 40 | 800 | 28 | 797 | 73 | 430 | 78 | 5 | Comp. Ex. |
| 13 | | GA | 1250 | 0.33 | 920 | 550 | 53 | 839 | 41 | 801 | 30 | 798 | 40 | 410 | 420 | 30 | Comp. Ex. |
| 14 | B | CR | 1260 | 0.33 | 890 | 600 | 58 | 851 | 49 | 800 | 30 | 795 | 63 | 430 | 59 | 33 | Ex. |
| 15 | | GI | 1250 | 0.06 | 890 | 480 | 31 | 857 | 39 | 792 | 35 | 790 | 62 | 390 | 57 | 43 | Ex. |
| 16 | | GA | 1250 | 0.36 | 880 | 620 | 66 | 852 | 36 | 791 | 34 | 789 | 64 | 420 | 63 | 47 | Ex. |
| 17 | C | CR | 1270 | 0.36 | 890 | 500 | 52 | 858 | 44 | 791 | 30 | 787 | 76 | 390 | 70 | 43 | Ex. |
| 18 | | GI | 1240 | 0.25 | 850 | 570 | 56 | 857 | 34 | 785 | 39 | 781 | 48 | 430 | 40 | 41 | Ex. |
| 19 | | GA | 1270 | 0.07 | 920 | 550 | 32 | 863 | 45 | 787 | 38 | 784 | 72 | 400 | 71 | 42 | Ex. |
| 20 | D | CR | 1260 | 0.12 | 880 | 510 | 38 | 845 | 45 | 798 | 39 | 794 | 56 | 400 | 25 | 41 | Ex. |
| 21 | | GI | 1250 | 0.24 | 860 | 470 | 42 | 861 | 36 | 787 | 29 | 784 | 75 | 410 | 29 | 47 | Ex. |
| 22 | | GA | 1270 | 0.28 | 900 | 640 | 62 | 863 | 31 | 787 | 27 | 786 | 58 | 410 | 26 | 45 | Ex. |
| 23 | E | CR | 1270 | 0.08 | 920 | 520 | 44 | 851 | 42 | 793 | 21 | 790 | 42 | 400 | 77 | 32 | Ex. |
| 24 | | GI | 1240 | 0.31 | 920 | 500 | 46 | 853 | 30 | 784 | 25 | 782 | 61 | 430 | 31 | 30 | Ex. |
| 25 | | GA | 1250 | 0.06 | 860 | 650 | 37 | 852 | 44 | 791 | 36 | 788 | 56 | 410 | 30 | 52 | Ex. |
| 26 | F | CR | 1270 | 0.08 | 840 | 620 | 37 | 850 | 32 | 784 | 22 | 780 | 72 | 430 | 43 | 30 | Ex. |
| 27 | | GI | 1260 | 0.14 | 850 | 620 | 41 | 857 | 46 | 782 | 36 | 778 | 42 | 440 | 43 | 40 | Ex. |
| 28 | | GA | 1240 | 0.37 | 920 | 640 | 28 | 850 | 47 | 788 | 24 | 785 | 44 | 400 | 25 | 55 | Ex. |
| 29 | G | CR | 1250 | 0.36 | 860 | 650 | 31 | 860 | 32 | 780 | 25 | 777 | 45 | 440 | 60 | 52 | Ex. |
| 30 | | GI | 1240 | 0.06 | 900 | 580 | 46 | 842 | 49 | 797 | 31 | 796 | 47 | 400 | 27 | 41 | Ex. |
| 31 | | GA | 1260 | 0.24 | 920 | 530 | 58 | 858 | 37 | 790 | 32 | 789 | 58 | 410 | 54 | 44 | Ex. |
| 32 | H | CR | 1260 | 0.26 | 870 | 460 | 56 | 864 | 36 | 780 | 23 | 776 | 58 | 400 | 30 | 39 | Ex. |
| 33 | | CR | 1180 | −0.52 | 890 | 500 | 55 | 864 | 48 | 793 | 26 | 792 | 56 | 400 | 34 | 51 | Ex. |
| 34 | | GI | 1250 | 0.41 | 870 | 460 | 68 | 856 | 42 | 780 | 32 | 776 | 78 | 440 | 44 | 39 | Ex. |
| 35 | | GA | 1240 | 0.19 | 910 | 590 | 47 | 844 | 49 | 781 | 35 | 777 | 66 | 430 | 54 | 47 | Ex. |
| 36 | I | CR | 1260 | 0.39 | 850 | 590 | 44 | 849 | 46 | 783 | 37 | 779 | 69 | 430 | 21 | 54 | Ex. |
| 37 | | GI | 1260 | 0.17 | 850 | 490 | 57 | 843 | 37 | 788 | 35 | 784 | 77 | 390 | 67 | 41 | Ex. |
| 38 | | GA | 1260 | 0.28 | 870 | 500 | 29 | 862 | 39 | 790 | 38 | 788 | 65 | 440 | 24 | 49 | Ex. |
| 39 | J | CR | 1240 | 0.38 | 900 | 620 | 29 | 848 | 37 | 795 | 29 | 792 | 70 | 420 | 57 | 30 | Ex. |
| 40 | | GI | 1260 | 0.24 | 870 | 540 | 43 | 849 | 31 | 789 | 22 | 789 | 43 | 390 | 55 | 52 | Ex. |
| 41 | | GA | 1250 | 0.33 | 910 | 460 | 66 | 840 | 40 | 781 | 29 | 780 | 66 | 440 | 50 | 37 | Ex. |
| 42 | K | CR | 1260 | 0.39 | 890 | 460 | 36 | 854 | 47 | 784 | 31 | 779 | 63 | 400 | 74 | 32 | Ex. |
| 43 | | GI | 1250 | 0.11 | 850 | 530 | 33 | 864 | 37 | 783 | 32 | 780 | 48 | 420 | 24 | 50 | Ex. |

TABLE 2-continued

| Steel Sheet No. | Steel | Surface | Hot rolling process | | | | | Annealing process | | | | | | | | | Remarks |
|---|---|---|---|---|---|---|---|---|---|---|---|---|---|---|---|---|---|
| | | | Slab Heating Temp (° C.) | Expression (1) Left Side | Finish Rolling Finishing Temp (° C.) | Coiling Temp (° C.) | Cold Rolling Ratio (%) | Heating Temp (° C.) | Heating Retaining Time (s) | Post-Heating Retaining Temp (° C.) | Post-Heating Retaining Temp (s) | Cooling Start Temp (° C.) | Cooling Rate (° C./s) *1 | Cooling Stop Temp (° C.) | 350–450° C. Retaining time (s) | 150–250° C. Retaining time During Cooling (s) | |
| 44 | L | GA | 1240 | 0.33 | 870 | 600 | 42 | 852 | 36 | 781 | 20 | 779 | 67 | 420 | 66 | 43 | Ex. |
| 45 | L | CR | 1240 | 0.29 | 870 | 480 | 39 | 848 | 41 | 798 | 40 | 796 | 72 | 430 | 75 | 47 | Ex. |
| 46 | L | GI | 1250 | 0.09 | 900 | 470 | 46 | 857 | 37 | 798 | 24 | 793 | 58 | 390 | 21 | 53 | Ex. |
| 47 | L | GA | 1240 | 0.18 | 910 | 490 | 49 | 845 | 37 | 785 | 25 | 785 | 76 | 390 | 53 | 52 | Ex. |
| 48 | M | GA | 1270 | 0.35 | 920 | 510 | 62 | 841 | 34 | 783 | 38 | 782 | 49 | 440 | 48 | 40 | Ex. |
| 49 | N | GA | 1270 | 0.24 | 870 | 510 | 41 | 852 | 46 | 783 | 27 | 780 | 77 | 410 | 60 | 36 | Ex. |
| 50 | O | CR | 1270 | 0.28 | 890 | 480 | 35 | 845 | 40 | 789 | 31 | 784 | 74 | 390 | 73 | 53 | Comp. Ex. |
| 51 | P | CR | 1240 | 0.10 | 880 | 600 | 54 | 850 | 43 | 788 | 29 | 787 | 72 | 400 | 37 | 37 | Comp. Ex. |
| 52 | Q | CR | 1270 | 0.13 | 930 | 530 | 60 | 857 | 34 | 793 | 22 | 789 | 42 | 390 | 71 | 32 | Comp. Ex. |

*1) Average cooling rate between cooling start temperature and 450° C.
The values underlines indicate the ranges are outside the present invention.

Test samples were taken from cold-rolled steel sheet (CR material), hot-dipped steel sheet (GI material) or alloyed hot-dipped steel sheet (GA material) obtained as described above and evaluated by the following method.

Structure Observation

Area ratios of the phases each were evaluated by the following method. Test samples were taken from a steel sheet so that a cross-section parallel to the rolling direction may be used as an observation surface and a portion of the center of the sheet thickness was exposed by etching in 1% nital, and then a ¼t position (t is sheet thickness) was photographed under a scanning type electron microscope at a magnification ratio of 2000 with 10 visual fields. The ferrite phase is a structure which has an appearance that corrosion marks and iron-based carbides cannot be observed in the grains thereof, and martensite having iron-based carbides precipitated in the grains thereof is a structure where a large number of fine iron-based carbides with orientation and corrosion marks can be observed in the grains thereof. The area ratios of the ferrite phase, the martensite described above, and other structures were determined with the results shown in Table 3.

The grain diameters of the ferrite and martensite having iron-based carbides precipitated in the grains thereof was obtained by image analysis using image analysis software (Image-Pro Plus ver.7.0 by Nippon Roper Co., Ltd.). Table 3 shows the average values of the grain diameters. The photographs obtained with 10 visual fields for the measurement of the above area ratios were used for the image analysis. The average value of the grain diameters was calculated, where the diameter of a circle with the same area as that of each grain (ferrite grain or the martensite grain described above) is regarded as the grain diameter. In determining the grain diameter, the grain boundary of a ferrite grain or a martensite grain was determined from the outline of the metallographic structure.

To examine the concentration of the segregated elements at the interface between ferrite and martensite having iron-based carbides precipitated in the grains thereof, a prism test sample of 0.5 mm×0.5 mm×25 mm was taken from the central portion of the sheet thickness in a direction parallel to the sheet thickness direction, at a position across the interface between ferrite and martensite having iron-based carbides precipitated in the grains thereof, and electrolytic polishing was performed to prepare a test sample for measurement with an acicular tip. The concentration of an element present at the grain boundary (interface) was analyzed using a three-dimensional atom probe field ion microscope. The atomic concentrations of Si, Mn, Cr, Mo, Ni, B and Sb were obtained at the grain boundary having a width of ±0.25 nm away from the position where the element concentration was highest. The grain boundary was identified by a method of analyzing C and regarding a portion with the highest C concentration as the grain boundary.

Tensile Test

JIS No. 5 tensile test sample was prepared from the obtained steel sheet in a direction perpendicular to the rolling direction and subjected to a tensile test five times according to the provision of JIS Z 2241 (2011) to obtain respective average values of yield strength (YS), tensile strength (TS) and total elongation (El). The crosshead speed of the tensile test was 10 ram/min. In Table 3, the mechanical properties of the steel sheet required for the steel according to aspects of the present invention include tensile strength: 900 MPa or more and total elongation: 13% or more.

Spot Welding Evaluation

For the evaluation of weldability, a plated steel sheet of JAC270C with a sheet thickness of 1.0 mm according to the Japan Iron and Steel Federation Standard JFS A 3011: 2014 was sandwiched between two steel sheets according to aspects of the present invention or steel sheets of comparative example and subjected to spot welding. For the welding conditions, a dome radius type chromium copper electrode with a tip diameter of 7 mmϕ was used, with a welding time of 25 cycles (60 Hz), a pressing force of 300 kgf, and a nugget diameter of 6 mm. After welding the different angles, the angles between the normal direction of the steel plate and the electrode being 10° and 15°, each of the cross-sectional structure of the welded portion was observed to observe the presence of cracks. When cracks of 10 µm or more occurred, "×" was given as "failure", otherwise, "○" was given as "pass", and the results are shown in Table 3.

In any of the examples according to aspects of the present invention, the tensile strength (TS) is 900 MPa or more, and excellent weldability was obtained. Meanwhile, in the comparative examples outside the scopes of the present invention, tensile strength did not reach 900 MPa, or excellent weldability evaluation was not obtained.

TABLE 3

| Steel sheet No. | Steel sheet structure | | | | | | | Mechanical property of steel sheet | | | Weldability | | Remarks |
|---|---|---|---|---|---|---|---|---|---|---|---|---|---|
| | Area ratio of ferrite (%) | Area ratio of martensite having iron-based carbides (%) | Area ratio of other structure (%) *1 | Grain diameter of ferrite (μm) | Grain diameter of martensite having carbides (μm) | Si + Mn atomic concentration (Atom %) | Total concentration of M atoms (Atom %) *2 | Yield strength (MPa) | Tensile strength (MPa) | Elongation (%) | Evaluation 1 *3 | Evaluation 2 *4 | |
| 1 | 51 | 47 | 2 | 3.1 | 2.6 | 6 | — | 596 | 903 | 19 | ○ | X | Ex. |
| 2 | 41 | 58 | 1 | 3.8 | 3.5 | 7 | — | 668 | 915 | 19 | ○ | ○ | Ex. |
| 3 | 57 | 36 | 7 | 2.2 | 2.4 | 11 | — | 608 | 908 | 19 | ○ | ○ | Ex. |
| 4 | 59 | 34 | 7 | 1.8 | 3.2 | 3 | — | 617 | 907 | 19 | X | X | Comp. Ex. |
| 5 | 70 | 30 | 0 | 3.5 | 1.8 | 4 | — | 660 | 916 | 20 | X | X | Comp. Ex. |
| 6 | 52 | 44 | 4 | 5.8 | 6.1 | 6 | — | 631 | 889 | 20 | X | X | Comp. Ex. |
| 7 | 12 | 62 | 26 | 3.2 | 2.0 | 4 | — | 807 | 1153 | 8 | X | X | Comp. Ex. |
| 8 | 79 | 15 | 6 | 2.2 | 3.3 | 4 | — | 607 | 879 | 20 | ○ | X | Comp. Ex. |
| 9 | 56 | 40 | 4 | 3.5 | 5.8 | 4 | — | 651 | 917 | 19 | X | X | Comp. Ex. |
| 10 | 63 | 35 | 2 | 2.9 | 3.1 | 3 | — | 606 | 918 | 19 | X | X | Comp. Ex. |
| 11 | 58 | 34 | 8 | 3.8 | 3.4 | 3 | — | 643 | 919 | 20 | X | X | Comp. Ex. |
| 12 | 57 | 15 | 28 | 2.6 | 2.3 | 11 | — | 628 | 952 | 19 | X | X | Comp. Ex. |
| 13 | 30 | 43 | 27 | 2.9 | 2.9 | 3 | — | 636 | 879 | 21 | X | X | Comp. Ex. |
| 14 | 42 | 54 | 4 | 2.3 | 1.9 | 7 | — | 698 | 997 | 18 | ○ | ○ | Ex. |
| 15 | 43 | 51 | 6 | 3.6 | 3.8 | 7 | — | 716 | 1008 | 17 | ○ | ○ | Ex. |
| 16 | 45 | 51 | 4 | 3.1 | 2.7 | 7 | — | 695 | 993 | 18 | ○ | ○ | Ex. |
| 17 | 57 | 42 | 1 | 2.0 | 2.0 | 7 | — | 764 | 1158 | 16 | ○ | X | Ex. |
| 18 | 40 | 54 | 6 | 3.8 | 2.9 | 8 | — | 810 | 1157 | 15 | ○ | X | Ex. |
| 19 | 40 | 56 | 4 | 3.4 | 2.4 | 8 | — | 804 | 1165 | 16 | ○ | X | Ex. |
| 20 | 54 | 44 | 2 | 2.7 | 3.5 | 7 | — | 762 | 1154 | 16 | ○ | X | Ex. |
| 21 | 58 | 38 | 4 | 3.5 | 3.8 | 12 | — | 754 | 1143 | 16 | ○ | X | Ex. |
| 22 | 54 | 42 | 4 | 2.3 | 3.6 | 9 | — | 754 | 1142 | 16 | ○ | X | Ex. |
| 23 | 55 | 41 | 4 | 2.1 | 3.7 | 12 | — | 678 | 1028 | 18 | ○ | ○ | Ex. |
| 24 | 54 | 40 | 6 | 3.8 | 2.3 | 8 | — | 723 | 1033 | 18 | ○ | ○ | Ex. |
| 25 | 56 | 43 | 1 | 2.3 | 3.7 | 7 | — | 684 | 1036 | 17 | ○ | ○ | Ex. |
| 26 | 52 | 47 | 1 | 1.8 | 3.8 | 11 | — | 684 | 1021 | 17 | ○ | ○ | Ex. |
| 27 | 58 | 40 | 2 | 2.2 | 3.4 | 7 | — | 727 | 1024 | 17 | ○ | ○ | Ex. |
| 28 | 47 | 47 | 6 | 3.6 | 1.8 | 7 | — | 722 | 1031 | 18 | ○ | ○ | Ex. |
| 29 | 40 | 54 | 6 | 3.3 | 3.5 | 10 | — | 713 | 1004 | 18 | ○ | X | Ex. |
| 30 | 47 | 50 | 3 | 2.7 | 3.2 | 7 | — | 689 | 999 | 18 | ○ | ○ | Ex. |
| 31 | 44 | 55 | 1 | 2.4 | 2.9 | 7 | — | 718 | 997 | 17 | ○ | ○ | Ex. |
| 32 | 53 | 46 | 1 | 2.0 | 2.3 | 8 | 17 | 786 | 1077 | 17 | ○ | ○ | Ex. |
| 33 | 45 | 49 | 6 | 2.5 | 1.9 | 8 | 7 | 765 | 1063 | 18 | ○ | ○ | Ex. |
| 34 | 63 | 36 | 1 | 3.8 | 3.3 | 9 | 14 | 767 | 1080 | 16 | ○ | X | Ex. |
| 35 | 60 | 35 | 5 | 3.1 | 2.3 | 9 | 13 | 775 | 1076 | 17 | ○ | ○ | Ex. |
| 36 | 57 | 43 | 0 | 2.0 | 2.3 | 7 | 7 | 682 | 1034 | 17 | ○ | ○ | Ex. |
| 37 | 63 | 35 | 2 | 2.4 | 2.9 | 12 | 8 | 716 | 1037 | 17 | ○ | ○ | Ex. |
| 38 | 49 | 50 | 1 | 2.8 | 3.6 | 8 | 12 | 708 | 1026 | 18 | ○ | ○ | Ex. |

TABLE 3-continued

| Steel sheet No. | Area ratio of ferrite (%) | Area ratio of martensite having iron-based carbides (%) | Area ratio of other structure (%) *1 | Grain diameter of ferrite (μm) | Grain diameter of martensite having carbides (μm) | Si + Mn atomic concentration (Atom %) | Total concentration of M atoms (Atom %) *2 | Yield strength (MPa) | Tensile strength (MPa) | Elongation (%) | Evaluation 1 *3 | Evaluation 2 *4 | Remarks |
|---|---|---|---|---|---|---|---|---|---|---|---|---|---|
| 39 | 41 | 57 | 2 | 3.8 | 3.8 | 7 | 10 | 718 | 1072 | 17 | ◯ | ◯ | Ex. |
| 40 | 53 | 41 | 6 | 2.5 | 2.1 | 7 | 17 | 753 | 1060 | 17 | ◯ | ◯ | Ex. |
| 41 | 44 | 55 | 1 | 1.9 | 2.5 | 8 | 15 | 743 | 1062 | 17 | ◯ | ◯ | Ex. |
| 42 | 47 | 50 | 3 | 3.0 | 3.3 | 8 | 13 | 810 | 1227 | 14 | ◯ | ◯ | Ex. |
| 43 | 42 | 51 | 7 | 2.0 | 2.9 | 11 | 7 | 854 | 1220 | 15 | ◯ | ◯ | Ex. |
| 44 | 55 | 41 | 4 | 3.5 | 3.3 | 12 | 12 | 853 | 1236 | 15 | ◯ | ◯ | Ex. |
| 45 | 50 | 50 | 0 | 3.0 | 3.1 | 8 | 13 | 899 | 1248 | 15 | ◯ | ◯ | Ex. |
| 46 | 61 | 35 | 4 | 2.8 | 3.5 | 12 | 13 | 837 | 1231 | 15 | ◯ | ◯ | Ex. |
| 47 | 49 | 45 | 6 | 2.1 | 2.4 | 11 | 11 | 898 | 1247 | 15 | ◯ | ◯ | Ex. |
| 48 | 52 | 47 | 1 | 2.0 | 2.5 | 12 | 8 | 710 | 1029 | 18 | ◯ | ◯ | Ex. |
| 49 | 57 | 39 | 4 | 2.3 | 2.4 | 10 | 14 | 781 | 1184 | 15 | ◯ | ◯ | Ex. |
| 50 | 48 | 45 | 7 | 2.1 | 3.0 | 12 | — | 575 | <u>799</u> | 23 | ◯ | ◯ | Ex. |
| 51 | 58 | 40 | 2 | 2.1 | 2.1 | <u>3</u> | 11 | 642 | 987 | 18 | X | X | Ex. |
| 52 | 47 | 53 | 0 | 1.8 | 3.7 | <u>3</u> | 14 | 666 | 925 | 20 | X | X | Ex. |

※1) Total area ratio of metallographic structure other than ferrite and tempered martensite
※2) Total concentration of M atoms (Cr, Mo, Ni, B, and Sb)
※3) Determination result of cross-sectional structure when the angle of the normal direction of the steel sheet and the electrode is at 10°
※4) Determination result of cross-sectional structure when the angle of the normal direction of the steel sheet and the electrode is at 15°
The underlined values are outside the ranges according to the present invention.

All the examples according to aspects of the present invention satisfy the weldability evaluation 1. Meanwhile, under the welding condition 2 that is a more severe condition, the samples at the level satisfying preferable range of the slab heating condition in addition to the controlled grain boundary atom concentrations of Cr, Mo, Ni, B and Sb, were excellent.

The invention claimed is:

1. A steel sheet having a composition comprising, in mass %,
C: 0.05% or more and 0.20% or less,
Si: 0.60% or more and 1.65% or less,
Mn: 1.8% or more and 3.5% or less,
P: 0.05% or less,
S: 0.005% or less,
Al: 0.08% or less, and
N: 0.0060% or less,
the balance being Fe and inevitable impurities,
the steel sheet having a metallographic structure containing, in terms of an area ratio, ferrite of 25% or more and 65% or less, martensite having iron-based carbides precipitated in the grains thereof of 35% or more and 75% or less, and the balance structure other than the ferrite and the martensite having the iron-based carbides precipitated in the grains thereof of 20% or less (including 0%) in total,
average grain diameters of the ferrite and the martensite having the iron-based carbides precipitated in the grains thereof being respectively 5 μm or lower, and
a total of concentrations of Si and Mn at interface between the ferrite and the martensite having the iron-based carbides precipitated in the grains thereof being, in terms of an atomic concentration, 5% or more, and
the steel sheet having a tensile strength of 900 MPa or higher.

2. The steel sheet according to claim 1, wherein the composition further comprises, in mass %, at least one selected from Group A, B and C,
Group A: one or more selected from the group consisting of
V: 0.001% or more and 1% or less,
Ti: 0.001% or more and 0.3% or less, and
Nb: 0.001% or more and 0.3% or less,
Group B: one or more selected from the group consisting of
Cr: 0.001% or more and 1.0% or less,
Mo: 0.001% or more and 1.0% or less,
Ni: 0.001% or more and 1.0% or less,
B: 0.0001% or more and 0.0050% or less, and
Sb: 0.001% or more and 0.050% or less, and wherein
a total of concentrations of Cr, Mo, Ni, B and Sb at interface between the ferrite and the martensite having the iron-based carbides precipitated in the grains thereof is 5% or more in terms of an atomic concentration, and
Group C: 0.0001% or more and 0.1% or less in total of one or more selected from the group consisting of REM, Sn, Mg, and Ca.

3. The steel sheet according to claim 2, provided with a plated layer on a surface thereof.

4. The steel sheet according to claim 3, wherein the plated layer has a composition comprising, in mass %,
Fe: 20.0% or less,
Al: 0.001% or more and 3.5% or less, and
0% or more and 3.5% or less in total of one or more selected from the group consisting of Pb, Sb, Si, Sn, Mg, Mn, Ni, Cr, Co, Ca, Cu, Li, Ti, Be, Bi and REM,
the balance being Zn and inevitable impurities.

5. The steel sheet according to claim 4, wherein the plated layer is an alloyed hot-dip layer.

6. The steel sheet according to claim 3, wherein the plated layer is an alloyed hot-dip layer.

7. The steel sheet according to claim 1, provided with a plated layer on a surface thereof.

8. The steel sheet according to claim 7, wherein the plated layer has a composition comprising, in mass %,
Fe: 20.0% or less,
Al: 0.001% or more and 3.5% or less, and
0% or more and 3.5% or less in total of one or more selected from the group consisting of Pb, Sb, Si, Sn, Mg, Mn, Ni, Cr, Co, Ca, Cu, Li, Ti, Be, Bi and REM,
the balance being Zn and inevitable impurities.

9. The steel sheet according to claim 8, wherein the plated layer is an alloyed hot-dip layer.

10. The steel sheet according to claim 7, wherein the plated layer is an alloyed hot-dip layer.

11. A production method for the steel sheet of claim 1, the method comprising:
heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;
cold rolling the hot-rolled steel material; and
after cold rolling, heating and retaining the cold-rolled steel material at 840° C. or higher for 20 seconds or more and 180 seconds or less, then cooling, retaining at 770° C. or higher and 820° C. or lower for 10 seconds or more, and cooling under conditions that an average cooling rate is 35° C./s or more between cooling start temperature and 450° C., and a retention time at 150° C. or higher and 250° C. or lower is 20 seconds or more.

12. A production method for the steel sheet of claim 2, the method comprising:
heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;
cold rolling the hot-rolled steel material; and
after cold rolling, heating and retaining the cold-rolled steel material at 840° C. or higher for 20 seconds or more and 180 seconds or less, then cooling, retaining at 770° C. or higher and 820° C. or lower for 10 seconds or more, and cooling under conditions that an average cooling rate is 35° C./s or more between cooling start temperature and 450° C., and a retention time at 150° C. or higher and 250° C. or lower is 20 seconds or more.

13. A production method for the steel sheet of claim 7, comprising:
heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

14. A production method for the steel sheet of claim 3, comprising:

heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

15. A production method for the steel sheet of claim 8, comprising:

heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

16. A production method for the steel sheet of claim 4, comprising:

heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

17. A production method for the steel sheet of claim 10, comprising:

heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

18. A production method for the steel sheet of claim 6, comprising:

heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

19. A production method for the steel sheet of claim 9, comprising:

heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

20. A production method for the steel sheet of claim 5, comprising:

heating a steel material at 1150° C. or higher and 1350° C. or lower, hot rolling including rough rolling and finish rolling the steel material at a finishing temperature of the finish rolling being 820° C. or higher, and coiling the steel material at 350° C. or higher and 680° C. or lower;

cold rolling the hot-rolled steel material; and after cold rolling, heating and retaining the cold-rolled steel material at 840° C. or higher for 20 seconds or more and 180 seconds or less, then cooling, retaining at 770° C. or higher and 820° C. or lower for 10 seconds or more, cooling at an average cooling rate of 35° C./s or more between a cooling start temperature and 450° C., subsequently, performing a plating treatment by immersing the resultant cold-rolled steel material in a plating bath, optionally performing alloying treatment, and cooling the resultant steel material under condition that the retention time at 150° C. or higher and 250° C. or lower is 20 seconds or more.

\* \* \* \* \*